United States Patent [19]

Freedman

[11] 3,742,055

[45] June 26, 1973

[54] 3-AMINO-BICYCLO[2.2.2]OCTAN-2-OLS
[75] Inventor: Jules Freedman, Thiensville, Wis.
[73] Assignee: Colgate Palmolive, New York, N.Y.
[22] Filed: July 31, 1969
[21] Appl. No.: 846,605

Related U.S. Application Data
[63] Continuation-in-part of Ser. No. 797,233, Feb. 6, 1969.

[52] U.S. Cl. 260/570.5 CA, 260/247.7 E, 260/268 B, 260/294.7, 260/307 R, 260/326.5 R, 260/326.5 C, 260/468 B, 260/471 C, 260/501.17, 260/563 P, 260/566 A, 260/566 F, 260/567.6 M, 424/248, 424/250, 424/267, 424/274, 424/330, 424/329
[58] Field of Search............. 260/501.17, 570.5 CA

[56] References Cited
UNITED STATES PATENTS
3,148,118  9/1964  Thesing et al. .............. 260/570.5 X

OTHER PUBLICATIONS

Burger, "Medicinal Chemistry," 2nd Ed., pages 82–83 (1960)

Primary Examiner—Robert V. Hines
Attorney—T. F. Kryshak and M. L. Youngs

[57] ABSTRACT

The compounds are 3-amino-bicyclo[2.2.2.]octan-2-ols which are useful as central nervous system stimulants. Representative compounds disclosed in the application are 2-benzyl-cis-3-aminobicyclo[2.2.2]octan-2-ol hydrochloride, N-2-butyl-2-(3-trifluoromethylphenyl)cis-3-aminobicyclo [2.2.2.]octan-2-ol, and 2-phenyl-3-pyrrolidino-2-bicyclo [2.2.2]octan-2-ol maleate.

8 Claims, No Drawings

3-AMINO-BICYCLO[2.2.2]OCTAN-2-OLS

RELATED CASE

This is a continuation-in-part of my earlier application Ser. No. 797,233 filed Feb. 6, 1969.

DESCRIPTION OF THE INVENTION

The compounds of the present invention may be represented by the following formula:

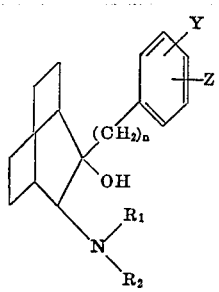

I in which Y and Z are selected from hydrogen, a halogen such as bromine, chlorine or fluorine, trifluoromethyl, lower alkoxy of one to four carbon atoms such as methoxy, ethoxy and propoxy, aralkoxy of seven to 13 carbon atoms such as benzyloxy and phenethoxy, $n$ is 0 or 1, and $R_1$ and $R_2$ are selected from hydrogen, a lower alkyl of one to four carbon atoms such as methyl, ethyl, propyl and isopropyl, phenyl-lower alkyl of seven to 13 carbon atoms such as benzyl, phenethyl or phenylisopropyl, $COOR_3$ in which $R_3$ is lower alkyl or a phenyl-lower alkyl of seven to 13 carbon atoms and groups in which

is a cyclic amino group such as morpholino, pyrrolidino, piperidino and 4-lower alkyl-1-piperazino.

The compounds of the present invention may be conveniently prepared from 4-carboxycyclohexaneacetic acid dimethyl ester which has the following formula

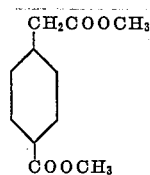

II

This compound is known to those skilled in the art and may be prepared as described in the literature or as illustrated in the example which is included hereafter.

In the preferred method of the invention the 4-carboxy-cyclohexaneacetic acid dimethyl ester is dissolved in dry toluene and is added dropwise to a refluxing suspension of sodium hydride in dry toluene. The mixture is refluxed for an extended period of time, up to and exceeding 20 hours, and then cooled and added cautiously to a mixture of concentrated hydrochloric acid and ice to form 3-oxabicyclo[2.2.2]octan-2-carboxylic acid methyl ester. The thus obtained methyl ester is added to an aqueous solution of sodium hydroxide and the resulting mixture treated with nitrous acid. The resulting precipitate is bicyclo[2.2.2]octan-2,3-dione monoxime. A solution of the monoxime in methanol is reduced at a pressure of 60 lbs. per square inch of hydrogen in the presence of 5 percent platinum on charcoal catalyst and an equivalent amount of concentrated hydrochloric acid to form the 3-amino-bicyclo[2.2.2]octanone hydrochloride. The thus formed 3-amino-bicyclo[2.2.2]octanone is then treated with a suitable Grignard reagent under normal Grignard reaction conditions to form the 3-amino-bicyclo[2.2.2]octan-2-ol.

The 3-amino-2-phenyl bicyclo[2.2.2]octan-2-ols may alternatively be prepared by treating the above described monoxime with a suitable Grignard reagent under normal Grignard reaction conditions to form the corresponding 3-phenyl-3-hydroxy-bicyclo[2.2.2]octanone oxime and then treating that compound with lithium aluminum hydride under reducing conditions.

The above described processes may be illustrated as follows:

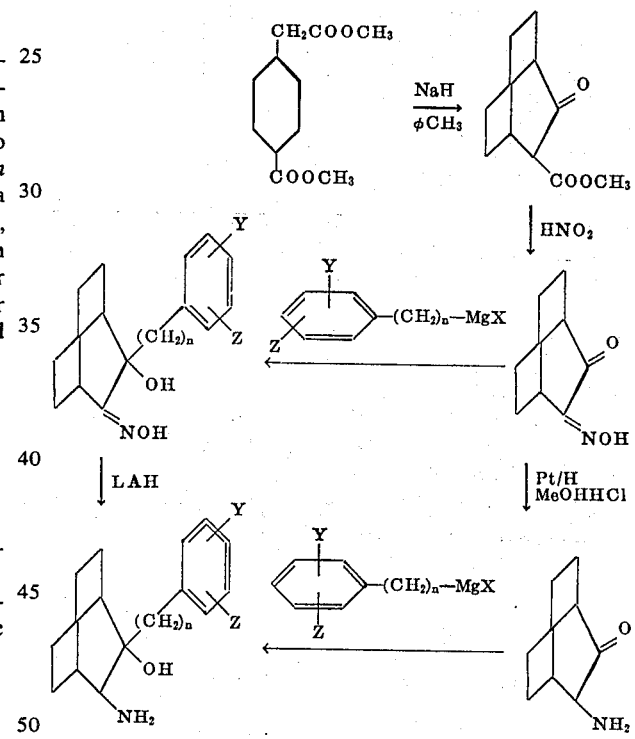

wherein Y, Z, R and $R_1$ are as previously described and do not partake in or interfere with the reactions.

Representative of the Grignard reagents which may be employed in the described process are those prepared by the reaction of magnesium in an anhydrous solvent, such as tetrahydrofuran, with one of the following:

bromobenzene,
4-benzyloxybromobenzene,
p-bromoanisole,
3-bromobenzotrifluoride,
α,3,4-trichlorotoluene,
1-bromo-3-chlorobenzene,
p-bromofluorobenzene,
3,5-dichlorobromobenzene,
3,4-dichlorobromobenzene,
3,4-difluorobromobenzene, and 3,4-ditrifluoromethylbromobenzene.

Representative of the compounds which may be prepared by the described process are the following:

3-oxabicyclo[2.2.2]octane-2-carboxylic acid methyl ester,
bicyclo[2.2.2]octan-2,3-dione monoxime,
3-aminobicyclo[2.2.2]octanone hydrochloride,
3-amino-2-(3-chlorophenyl)bicyclo[2.2.2]octan-2-ol,
3-amino-2-(3-fluorophenyl)bicyclo[2.2.2]octan-2-ol,
3-amino-2-phenylbicyclo[2.2.2]octan-2-ol,
3-amino-2-(4-benzyloxyphenyl)bicyclo[2.2.2]octan-2-ol,
3-amino-2-p-anisylbicyclo[2.2.2]octan-2-ol maleate,
3-amino-2-(3-trifluoromethylphenyl)bicyclo[2.2.2]octan-2-ol hydrochloride,
2-benzyl-3-aminobicyclo[2.2.2]octan-2-ol,
2-(3,4-dichlorobenzyl)-3-aminobicyclo[2.2.2]octan-2-ol,
2-(3-chlorophenyl)-3-aminobicyclo[2.2.2]octan-2-ol hydrochloride,
2-(4-fluorophenyl)-3-aminobicyclo[2.2.2]octan-2-ol,
2-(3,5-dichlorophenyl)-3-aminobicyclo[2.2.2]octan-2-ol hydrochloride, and
3-amino-2-(3,4-dichlorophenyl)bicyclo[2.2.2]octan-2-ol hydrochloride.

Secondary and tertiary amines may be prepared from the above described primary amines by conventional techniques. For example, the corresponding secondary amine, the methylamino compound may be prepared from the corresponding N-carbomethoxy-2-(phenyl or benzyl)-3-aminobicyclo[2.2.2]octan-2-ol by treating it with lithium aluminum hydride in anhydrous ether under reflux conditions.

The corresponding N-isopropyl derivative compound may be prepared by treating a 2-(phenyl or benzyl)-3-aminobicyclo [2.2.2]octan-2-ol with acetone and ethanol under reflux to form a 2-(phenyl or benzyl)-4,4-dimethyl-3,5-oxazatricyclo [5.2.2.0$^{2,6}$]undecane. The thus obtained intermediate compound is then treated with lithium aluminum hydride in dry tetrahydrofuran or ether under reflux conditions to yield the desired N-isopropyl derivative.

The corresponding dimethyl derivative may be prepared by treating the selected amino alcohol with a mixture of 90 percent formic acid and 37 percent formaldehyde under reflux conditions to form the corresponding 2-(phenyl or benzyl)-5-methyl-3,5-oxazatricyclo[5.2.2.0$^{2,6}$]undecane which upon treatment with lithium aluminum hydride yields the desired dimethyl derivative.

The processes may be illustrated as follows:

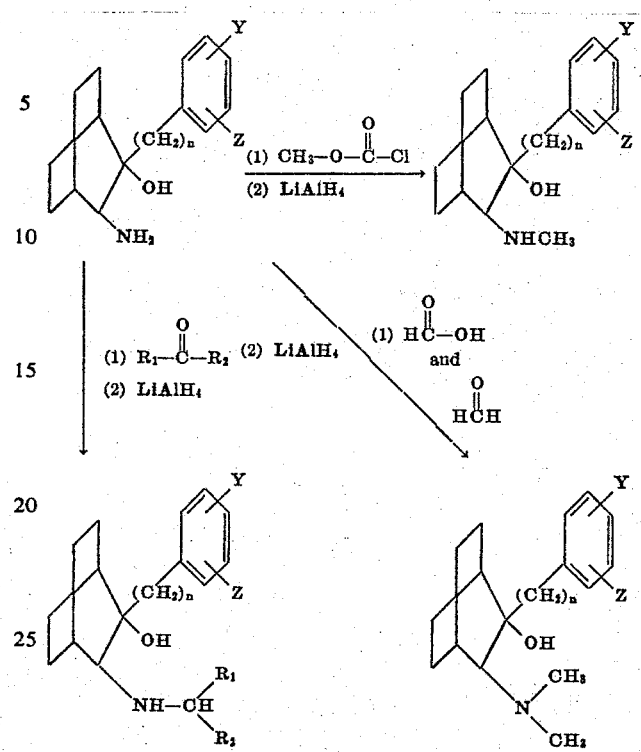

wherein the symbols n, Y, Z, R$_1$ and R$_2$ are as previously defined and do not interfere with or partake in the reaction.

Representative of the compounds which may be prepared by the described process are the following:

2-(3-chlorophenyl)-4,4-dimethyl-3,4-oxazatricyclo[5.2.2.0$^{2,6}$]undecane,
N-isopropyl-2-(chlorophenyl)-3-aminobicyclo[2.2.2]octan-2-ol,
2-(3-chlorophenyl)-5-methyl-3,5-oxazatricyclo[5.2.2.0$^{2,6}$]undecane hydrochloride,
N,N-dimethyl-2-(3-chlorophenyl)-3-aminobicyclo[2.2.2]octan-2-ol hydrochloride,
N-carbomethoxy-2-(3-chlorophenyl)-3-aminobicyclo[2.2.2]octan-2-ol,
N-methyl-2-(3-chlorophenyl)-3-aminobicyclo[2.2.2]octan-2-ol,
3-methylamino-2-phenylbicyclo[2.2.2]octan-2-ol,
N-carbomethoxy-2-phenyl-3-aminobicyclo[2.2.2]octan-2-ol,
N-carbomethoxy-2-(3-trifluoromethylphenyl)-3-amino-bicyclo[2.2.2]octan-2-ol and 2-(3-trifluoromethylphenyl) 3,4-oxazatricyclo-[5.2.2.0$^{2,6}$]undecan-4-one,
2-phenyl-4,4-dimethyl-3,5-oxazatricyclo[5.2.2.0$^{2,6}$]undecane,
2-(3-trifluoromethyl)-4,4-dimethyl-3,5-oxazatricyclo[5.2.2.0$^{2,6}$]undecane,
N-isopropyl-2-phenyl-3-aminobicyclo[2.2.2]octan-2-ol maleate,
N-isopropyl-2-p-anisyl-3-aminobicyclo[2.2.2]octan-2-ol hydrochloride,
N-isopropyl-2-(3-trifluoromethylphenyl)-3-aminobicyclo[2.2.2]octan-2-ol,
N,N-dimethyl-2-phenyl-3-aminobicyclo[2.2.2]octan-2-ol maleate,
N,N-dimethyl-2-phenyl-3-aminobicyclo[2.2.2]octan-2-ol methobromide
N-benzyl-2-phenyl-3-aminobicyclo[2.2.2]octan-2-ol maleate,
3-pyrrolidino-2-phenylbicyclo[2.2.2]octan-2-ol maleate,
2-benzyl-3-aminobicyclo[2.2.2]octan-2-ol,
N-2-butyl-2-(3-trifluoromethylphenyl)-3-aminobicyclo [2.2.2]octan-2-ol hydrochloride,
N-cyclopentyl-2-(3,4-dichlorophenyl)-3aminobicyclo [2.2.2]octan-2-ol hydrochloride,
N-isopropyl-2-(3-chlorophenyl)-3-aminobicyclo[2.2.2]octan-2-ol hydrochloride,
2-(4-fluorophenyl)-4,4-dimethyl-3,5-oxazatricyclo[5.2.2.0$^{2,6}$]undecane,
N-isopropyl-2-(4-fluorophenyl)-3-aminobicyclo[2.2.2]octan-2-ol hydrochloride,
2-(3,4-dichlorobenzyl)-4,4-dimethyl-3,5-oxazatricyclo[5.2.2.0$^{2,6}$]undecane,
N-isopropyl-2-(3,4-dichlorobenzyl)-3-aminobicyclo[2.2.2]octan-2-ol hydrochloride,
N-2-phenethyl-2-(3,4-dichlorophenyl)-3-aminobicyclo [2.2.2]octan-2-ol hydrochloride,
N,N-dimethyl-2-(3-trifluoromethylphenyl)-3-aminobicyclo[2.2.2]octan-2-ol hydrochloride,
N-methyl-2-(3,4-dichlorophenyl)-3-aminobicyclo [2.2.2]octan-2-ol hydrochloride,
2-(3,4-dichlorophenyl)-4,4-dimethyl-3,5-oxazatricyclo[5.2.2.0$^{2,6}$]undecane,
N-isopropyl-2-(3,4-dichlorophenyl)-3-aminobicyclo [2.2.2]octan-2-ol, and
N,N-dimethyl-2-(3,4-dichlorophenyl)-3-aminobicyclo [2.2.2]octan-2-ol hydrochloride.

The compounds of the present invention are basic in nature and form acid addition salts with inorganic and organic acids such as formic acid, citric acid, maleic acid, sulphuric acid, hydrochloric acid, tartaric acid or fumaric acid. The compounds also form quaternary ammonium salts when treated with suitable alkylating agents such as methyl chloride, ethyl iodide or methyl bromide.

The novel compounds of the present invention and their nontoxic acid addition salts are useful as pharmaceutical agents. The compounds N-2-butyl-2-(3-trifluoromethylphenyl)-3-aminobicyclo[2.2.2]octan-2-ol and N-2-benzyl-cis-3-aminobicyclo[2.2.2]octan-2-ol when administered to animals produce a mild to moderate central nervous system stimulation. In mice receiving 10 to 300 mg/kg of the compounds intraperitoneally in the form of an aqueous suspension there was observed elevations of mood characteristics, of awareness and of motor coordination, which are characteristic of central nervous system stimulant activity. As a result of the tests the compounds were found to have intraperitoneal LD$_{50}$'s in excess of 50 mg/kg in mice. The tests were conducted in accordance with the procedure set forth by Irwin in "Animal and Clinical Pharmacologic Techniques in Drug Evaluation", J. H. Nodine and P. E. Siegler, Ed., Year Book Publishers, Inc. 1964, pp. 36–54.

The compounds N-methyl-2-(3,4-dichlorophenyl)-3-aminobicyclo[2.2.2]octan-2-ol and N-isopropyl-2-(3,4-dichlorophenyl)-3-aminobicyclo[2.2.2]octan-2-ol when administered to animals also produced a central nervous system stimulation. In mice receiving 10 to 300 mg/kg of the compounds intraperitoneally in the form of an aqueous suspension there was observed elevations of mood characteristics, of awareness and of motor coordination, which are characteristic of central nervous system stimulant activity. As a result of the tests the compounds were found to have intraperitoneal LD$_{50}$'s in excess of 50 mg/kg in mice. The tests were conducted in accordance with the procedure set forth by Irwin in "Animal and Clinical Pharmacologic Techniques in Drug Evaulation", J. H. Nodine and P. E. Siegler, Ed., Year Book Publishers, Inc. 1964, pp. 36–54.

The two previously named compounds, in addition, possess antidepressant properties. For example, they were found to exhibit a norepinephrine potentiating effect in a test employing the isolated vas deferens of the rat. In addition, the compounds in doses of 5 to 20 mg/kg intraperitoneally were found to produce an antagonism of reserpine induced depression in the classic reserpine antagonism test. It is well accepted that compounds which both reverse reserpine depression and potentiate norepinephrine possess an antidepressant type activity.

When intended for pharmaceutical use the compounds are preferably utilized in the form of a nontoxic acid addition salt; however, the free base form of the compound may be employed. The active ingredient is usually combined with conventional pharmaceutical additives, such as diluents, flavoring agents, disintegrating agents and the like, and then formed into conventional pharmaceutical dosage forms such as tablets, capsules, suspensions for oral administrations, or sterile solutions for parenteral administration. Typical dosage forms will generally contain from 5 to 75 mg. of the active ingredient.

A typical tablet may have the following compositions:

| | Mg. |
|---|---|
| N-isopropyl-2-(3-chlorophenyl)-3-aminobicyclo[2.2.2]octan-2-ol | 20 |
| Lactose | 136.5 |
| Corn starch | 20 |
| Corn Starch (as 10% starch paste) | 3.4 |
| Magnesium stearate | 1.3 |

The tablets are formed using a 5/16 inch diameter punch for compression.

Capsules may be prepared by filling No. 3 hard gelatin capsules with the following ingredients:

| | Mg. |
|---|---|
| N-isopropyl-2-(3-chlorophenyl)-3-aminobicyclo[2.2.2]octan-2-ol | 20 |
| Lactose U.S.P. | 200 |
| Starch U.S.P. | 16 |
| Talc U.S.P. | 8 |

In clinical practice the daily dosage of the active ingredient may range from 20 mg. to 250 mg. The exact amount to be administered will, of course, vary with the patient's size and the severity of his condition.

The compounds may also be employed to form other useful products. The thiocyanic acid addition salts of the compounds of this invention, when condensed with formaldehyde, form resinous materials useful as pickling agents according to U.S. Pat. Nos. 2,425,320 and 2,606,155. The compounds also form fluosilicic acid addition salts which are useful as wood preservatives and mothproofing agents according to U.S. Pat. Nos. 1,915,334 and 2,075,359.

The following examples illustrate the practice of the invention.

EXAMPLE 1

4-Carboxycyclohexaneacetic Acid Dimethyl Ester

A solution of disodium homoterephthalate (1 M) in 500 ml. of water is reduced at 1,000 lbs. with the aid of 0.3 percent by weight of 5 percent rhodium-alumina. When uptake of hydrogen ceases, the catalyst is filtered, the filtrate acidified with concentrated hydrochloric acid and the solid which forms filtered and air dried. The diacid is dissolved in 500 ml. of methanol containing 5 ml. of concentrated sulfuric acid and the mixture refluxed for 22 hours. The methanol is removed at reduced pressure, the residue taken up in ether, and the ether solution washed with water, dilute bicarbonate solution and water, and dried over calcium chloride. Distillation yields 4-carboxycyclohexaneacetic acid dimethyl ester, b.p. 112°–114°/1.3 mm.

Anal. Calcd. for $C_{11}H_{18}O_4$: C, 61.67; H, 8.47.

Found: C, 61.95; H, 8.70.

EXAMPLE 2

3-Oxobicyclo[2.2.2]octane-2-carboxylic Acid Methyl Ester

A solution of 642 g. (3 M) of 4-carboxycyclohexaneacetic acid dimethyl ester in 500 ml. of dry toluene is added dropwise over 3.75 hours to a stirred, refluxing suspension of sodium hydride (from 300 g. of 53 percent mixture in oil) in 6 liters of dry toluene. After refluxing 20 hours, the mixture is cooled and added cautiously to a mixture of 550 ml. of concentrated hydrochloric acid, 2.5 liters of water, and 2.5 kg. ice. Stirring is continued until the yellow color disappears. The layers are separated, the organic phase dried over calcium chloride, and fractionated to give 3-oxobicyclo[2.2.2]octane-2-carboxylic acid methyl ester, b.p. 121°–122°/4.5 mm.

Anal. Calcd. for $C_{10}H_{14}O_3$: C, 65.95; H, 7.75.

Found: C, 65.84; H, 7.83.

EXAMPLE 3

Bicyclo[2.2.2]octan-2,3-dione Monoxime

The keto-ester (254 g., 1.4 M) of Example 2 is added all at once to a stirred solution of 61.7 g. (1.54 M) of NaOH in 1.4 liters of distilled water. After stirring 1 hour, a solution of 100 g. (1.44 M) of sodium nitrite in 300 ml. of distilled water is added dropwise and the mixture stirred at room temperature for 18 hours. After cooling in ice, 500 ml. of 6N HCl is added dropwise over 4 hours and the precipitate filtered and air dried. Recrystallization from carbon tetrachloride gives bicyclo[2.2.2]octan-2,3-dione monoxime, m.p. 131°–134°.

Anal. Calcd. for $C_8H_{11}NO_2$: C, 62.72; H, 7.25; N, 9.15.

Found: C, 62.45; H, 7.42; N, 9.31.

EXAMPLE 4

3-Aminobicyclo[2.2.2]octanone Hydrochloride

A solution of 15.3 g. (0.1 M) of bicyclo[2.2.2]octan-2,3-dione monoxime in a mixture of 150 ml. of methanol and 10 ml. of concentrated HCl is reduced at 60 lbs. with the aid of 5 percent Pt/charcoal. When uptake ceases the catalyst is filtered, methanol removed and the residue diluted with acetone to give 3-aminobicyclo[2.2.2]octanone hydrochloride, m.p. 172°–175°, resolidifies 180°, decomposes 315°.

Anal. Calcd. for $C_8H_{14}ClNO$: C, 54.70; H, 8.05; N, 7.97; Cl, 20.19.

Found: C, 54.76; H, 7.85; N, 7.85; Cl, 19.95.

EXAMPLE 5

3-Amino-2-phenylbicyclo[2.2.2]octan-2-ol

3-Aminobicyclo[2.2.2]octanone hydrochloride (44 g., 0.25 M) is added in portions to the Grignard reagent prepared from 187 g. (1.25 M) bromobenzene, 30.5 g. (1.25 M) of magnesium and 1,100 ml. of ether. The mixture is stirred at room temperature for 18 hours, cooled in ice and treated with a mixture of 125 ml. of concentrated ammonia solution and 375 ml. of water. The ether phase is separated and extracted with dilute hydrochloric acid. Treatment of the acid extracts gives 3-amino-2-phenylbicyclo[2.2.2]octan-2-ol, m.p. 122°–125°. Extraction of the emulsified aqueous phase with ether and workup as above gives additional material, m.p. 120°–124°. A sample recrystallized from isopropanol melts at 125°–127°.

Anal. Calcd. for $C_{14}H_{19}NO$: C, 77.37; H, 8.82; N, 6.45.

Found: C, 76.97; H, 8.95; N, 6.36.

The maleate salt is prepared in ether and recrystallized from isopropanol, m.p. 201°–202°.

Anal. Calcd. for $C_{18}H_{23}NO_5$: C, 64.85; H, 6.96; N, 4.21.

Found: C, 64.68; H, 7.10; N, 3.98.

EXAMPLE 6

3-Amino-2-(4-benzyloxyphenyl)bicyclo[2.2.2]octan-2-ol

3-Aminobicyclo[2.2.2]octanone hydrochloride (8.8 g., 0.05 M) is added to the Grignard reagent prepared from 52.6 g. (0.2 M) 4-benzyloxybromobenzene, 4.86 g. (0.02 M) of magnesium and 200 ml. of tetrahydrofuran. The mixture is stirred at room temperature for 20 hours, cooled in ice and treated with a mixture of 25 ml. of concentrated aqueous ammonia and 475 ml. of water. The emulsion is filtered and the filtrate extracted with ether. On treatment of the organic phase with dilute hydrochloric acid, an insoluble oil separates which gives 3-amino-2-(4-benzyloxyphenyl)bicyclo[2.2.2]octan-2-ol, m.p. 120°–122°, on treatment with sodium hydroxide. Several recrystallizations from isopropanol gives a sample, m.p. 122°–123°.

Anal. Calcd. for $C_{21}H_{25}NO_2$: C, 77.96; H, 7.79; N, 4.33.

Found: C, 78.17; H, 7.64; N, 4.51.

EXAMPLE 7

3-Amino-2-p-anisylbicyclo[2.2.2]octan-2-ol Maleate

3-Aminobicyclo[2.2.2]octanone hydrochloride (13.2 g., 0.075 M) is added in portions to the Grignard reagent prepared from 72.9 g. (0.375 M) p-bromoanisole, 9.1 g. (0.0375 M) of magnesium, and 300 ml. of tetrahydrofuran. After stirring at room temperature for 21 hours, the mixture is cooled in ice and treated with a dilute ammonia. The organic phase is decanted from the emulsion and the latter extracted with several portions of ether. The combined organic phases are extracted with dilute hydrochloric acid and the acid extracts made basic with 10% NaOH. The solid which forms is dissolved in isopropanol and treated with a solution of maleic acid in isopropanol to give 3-amino-2-p-anisylbicyclo[2.2.2]octan-2-ol Maleate, m.p. 180°–181°. Recrystallization from isopropanol gives a sample, m.p. 183°–184.5°.

Anal. Calcd. for $C_{19}H_{25}NO_6$: C, 62.79; H, 6.93; N, 3.86.

Found: C, 63.02; H, 7.23; N, 4.08.

EXAMPLE 8

3-Amino-2-p-anisylbicyclo[2.2.2]octan-2-ol

The base is liberated from the maleate of Example 7 with 10% NaOH and recrystallized from petroleum ether, m.p. 103°–104°.

Anal. Calcd. for $C_{15}H_{21}NO_2$: C, 72.84; N, 8.56; N, 5.66.

Found: C, 73.15; H, 8.42; N, 5.56.

EXAMPLE 9

3-Amino-2-(3-trifluoromethylphenyl)bicyclo[2.2.2]octan-2-ol Hydrochloride

3-Aminobicyclo[2.2.2]octanone hydrochloride (14.0 g., 0.08 M) is added in portions to the Grignard reagent from 90.0 g. (0.4 M) of 3-bromobenzotrifluoride, 9.7 g. (0.4 M) of magnesium and 400 ml. of ether. After stirring 22 hours at room temperature, the mixture is cooled in ice and treated with dilute aqueous ammonia. The ether is decanted and the remaining emulsion extracted with several portions of ether. Treatment with aqueous HCl gives the crude hydrochloride salt, 3-amino-2-(3-trifluoromethylphenyl)bicyclo[2.2.2]octan-2-ol hydrochloride, which on recrystallization from methanol-acetonitrile melts at 255°–256°.

Anal. Calcd. for $C_{15}H_{19}ClF_3NO$: C, 55.99; H, 5.95; Cl, 11.02; F, 17.72; N, 4.35.

Found: C, 56.10; H, 6.11; Cl, 11.22; F, 17.93; N, 4.52.

EXAMPLE 10

3-Amino-2-(3-trifluoromethylphenyl)bicyclo[2.2.2]octan-2-ol

The aqueous acid filtrate of Example 9 on treatment with 10% NaOH gives 3-amino-2-(3-trifluoromethylphenyl)bicyclo[2.2.2]octan-2-ol as a solid, m.p. 105°–145°. Several recrystallizations from cyclohexane and petroleum ether gives a sample, m.p. 133°–135°.

Anal. Calcd. for $C_{15}H_{18}F_3NO$: C, 63.14; H, 6.36; F, 19.98; N, 4.91.

Found: C, 63.04; H, 6.46; F, 19.98; N, 5.21.

EXAMPLE 11

3-Methylamino-2-phenylbicyclo[2.2.2]octan-2-ol

A mixture of 5.42 g. (0.025 M) of 2-amino-3-phenylbicyclo[2.2.2]octan-2-ol, 5.02 g. (0.027 M) of methyl p-toluene-sulfonate and 75 ml. of toluene is refluxed for 7 hours, the solids which formed are filtered, dissolved in water and the solution treated with 10% NaOH to give the amino alcohol. Recrystallization from hexane-petroleum ether gives 3-methyl-amino-2-phenylbicyclo[2.2.2]octan-2-ol as a solid, m.p. 96°–98°.

Anal. Calcd. for $C_{15}H_{21}NO$: C, 77.85; H, 9.15; N, 6.06.

Found: C, 78.22; H, 9.21; N, 5.98.

EXAMPLE 12

N-Carbomethoxy-2-phenyl-3-aminobicyclo[2.2.2]octan-2-ol

A solution of 6.48 g. (0.03 M) of amino alcohol in 100 ml. of dry benzene and 5.0 ml. of $Et_3N$ is treated dropwise with 3.10 g. (0.033 M) of freshly distilled (b.p. 68°–69°) methyl chloroformate in 25 ml. of dry benzene. After 5 hours at room temperature 50 ml. of water is added, the layers are separated and the benzene solution shaken with 50 ml. of 3 N HCl, then water, and dried over $CaCl_2$. Treatment of the aqueous extracts with 10% NaOH gives only a trace of solid. Removal of the benzene gives an oil which solidified when triturated with hot petroleum ether. Recrystallization from methanol gives N-carbomethoxy-2-phenyl-3-aminobicyclo[2.2.2]octan-2-ol, m.p. 126.5°–128.5°.

Anal. Calcd. for $C_{16}H_{21}NO_3$: C, 69.81; H, 7.69; N, 5.09.

Found: C, 69.85; H, 7.54; N, 5.14.

EXAMPLE 13

N-Carbomethoxy-2-(3-trifluoromethylphenyl)-3-aminobicyclo[2.2.2]-octan-2-ol(A) and 2-(3-Trifluoromethylphenyl)3,4-oxazatricyclo-[5.2.2.0$^{2,6}$]undecan-4-one (B)

A mixture of 5.7 g. (0.02 M) of 2-(3-trifluoromethylphenyl)-3-aminobicyclo[2.2.2]octan-2-ol, 3.0 ml. of triethylamine and 50 ml. of dry benzene is cooled in ice and 2.08 g. (0.022 M) of freshly distilled (b.p. 69.5°–70°) methyl chloroformate in 25 ml. of dry benzene is added dropwise. After stirring 6 hours at room temperature, the solution is washed with 50 ml. of water, 50 ml. of 3 N HCl and 50 ml. of water. The aqueous extracts are washed with ether, the combined organic phases dried over $CaCl_2$ and the solvents removed. The residual oil is chromatographed on 200 g. of silica and chloroform. There are obtained three fractions, the urethane, m.p. 105°–106°, a mixture, and the oxazolidinone, m.p. 189°–190°.

The urethane is recrystallized from 25 ml. of cyclohexane to give N-carbomethoxy-2-(3-trifluoromethylphenyl)-3-amino-bicyclo[2.2.2]-octan-2-ol(A) as a solid, m.p. 108°–110°. The oxazolidinone was recrystallized from 25 ml. of $CCl_4$ to give 2-(3-trifluoromethylphenyl)3,4-oxazatricyclo[5.2.2.0$^{2,6}$]undecan-4-one (B), m.p. 190°–191° (softens 185°).

A. Anal. Calcd. for $C_{17}H_{20}F_3NO_3$: C, 59.46; H, 5.87; F, 16.60; N, 4.08.

Found: C, 59.44; H, 5.60; F, 16.52; N, 3.99.

B. Anal. Calcd. for $C_{16}H_{16}F_3NO_2$: C, 61.73; H, 5.18; N, 4.50.

Found: C, 62.12; H, 4.86; N, 4.15.

EXAMPLE 14

2-Phenyl-4,4-dimethyl-3,5-oxazatricyclo[5.2.2.0$^{2,6}$]undecane

A mixture of 2.17 g. (0.01 M) of 2-phenyl-3-aminobicyclo[2.2.2]octan-2-ol, 5.0 ml. of acetone and 25 ml. of ethanol is refluxed for 5 hours and the solvent removed with a stream of air. The residue has a melting point of 67°–69°. It is purified by sublimation. At 60°/50µ there is obtained 2-phenyl-4,4-dimethyl-3,5-oxazatricyclo[5.2.2.0$^{2,6}$]undecane as a solid, m.p. 68°–70°.

Anal. Calcd. for $C_{17}H_{23}NO$: C, 79.34; H, 9.01; N, 5.44.

Found: C, 78.90; H, 9.27; N, 5.28.

EXAMPLE 15

2-(3-Trifluoromethyl)-4,4-dimethyl-3,5-oxazatricyclo[5.2.2.0$^{2,6}$]undecane

A mixture of 5.7 g. (0.02 M) of 2-(3-trifluoromethylphenyl)-3-aminobicyclo[2.2.2]octan-2-ol, 10 ml. of acetone and 50 ml. of ethanol is refluxed for 5 hours and the solvents removed to give a solid, m.p. 86°–88°. Sublimation at 75°/50µ gives 2-(3-trifluoromethyl)-4,4-dimethyl-3,5-oxazatricyclo[5.2.2.0$^{2,6}$]undecane as a solid, m.p. 84°–86°.

Anal. Calcd. for $C_{18}H_{22}F_3NO$: C, 66.45; H, 6.81; F, 17.52; N, 4.31.

Found: C, 67.01; H, 6.65; F, 17.30; N, 4.26.

EXAMPLE 16

N-Isopropyl-2-phenyl-3-aminobicyclo[2.2.2]octan-2-ol maleate

A mixture of 4.34 g. (0.02 M) of 2-phenyl-3- aminobicyclo [2.2.2]octan-2-ol, 24.6 g. (0.2 M) of isopropyl bromide and 2.72 g. (0.02 M) of $K_2CO_3$ in 50 ml. of ethanol is refluxed 20 hours. Another 24.6 g. of isopropyl bromide is added and the mixture refluxed 24 hours. The solids are filtered and the ethanol removed at reduced pressure. The residue is taken up in ether and the solution treated with ethereal maleic acid to precipitate the salt. Recrystallization from 2-butanone gives N-isopropyl-2-phenyl-3-aminobicyclo[2.2.2]octan-2-ol maleate, m.p. 198°–200°.

Anal. Calcd. for $C_{21}H_{29}NO_5$: C, 67.17; H, 7.79; N, 3.74.

Found: C, 67.72; H, 7.55; N, 3.74.

EXAMPLE 17

N-Isopropyl-2-p-anisyl-3-aminobicyclo[2.2.2]octan-2-ol hydro-chloride

A mixture of 4.94 g. (0.02 M) of 2-p-anisyl-3-aminobicyclo [2.2.2]octan-2-ol, 49.2 g. (0.4 M) of isopropyl bromide 3.0 g. of $K_2CO_3$, and 50 ml. of ethanol is refluxed for 70 hours. The solids are filtered and washed with ether. The solvents are removed from the combined filtrate and the residue chromatographed on 125 g. of silica. Elution with chloroform gives an oil. This is converted to the hydrochloride salt with anhydrous HCl to give a solid, m.p. 240°–242°. Recrystallization from 75 ml. of isopropyl alcohol gives N-isopropyl-2-p-anisyl-3-aminobicyclo[2.2.2]octan-2-ol hydrochloride as a solid, m.p. 240°.

Anal. Calcd. for $C_{18}H_{28}ClNO_2$: C, 66.34; H, 8.66; Cl, 10.88; N, 4.30.

Found: C, 66.29; H, 8.74; Cl, 10.70; N, 4.31.

EXAMPLE 18

N-Isopropyl-2-(3-trifluoromethylphenyl)-3-aminobicyclo[2.2.2]octan-2-ol

A solution of 4.05 g. (0.0125 M) of 2-(3-trifluoromethylphenyl)-4,4-dimethyl-3,4-oxazatricyclo[5.2.2.0$^{2,6}$]undecane in 25 ml. of dry THF is added to 0.47 g. (0.0125 M) of $LiAlH_4$ in 50 ml. of dry THF and the mixture refluxed for 4 hours. After cooling in ice, 1.5 ml. of water is added, the suspension stirred 1 hour and filtered. Removal of the solvent leaves an oil. The hydrochloride is prepared in ether to give a solid, m.p. 257°–262°. Two recrystallizations from methanol-isopropanol gives N-isopropyl-2-(3-trifluoromethylphenyl)-3-aminobicyclo[2.2.2]octan-2-ol, m.p. 291°–293°.

Anal. Calcd. for $C_{18}H_{15}ClF_3NO$: C, 59.42; H, 6.91; F, 15.67; N, 3.85.

Found: C, 59.34; H, 7.06; F, 15.30; N, 3.88.

EXAMPLE 19

5-Methyl-2-phenyl-3,5-oxazatricyclo[5.2.2.0$^{2,6}$]undecane maleate

A mixture of 4.34 g. (0.02 M) of 2-phenyl-3-aminobicyclo [2.2.2]octan-2-ol, 30 ml. of 90 percent formic acid and 15 ml. of 37 percent formaldehyde is refluxed gently for 24 hours, 15 ml. of 6 N HCl is added and the water evaporated with a stream of air. The residue is dissolved in 50 ml. of 6 N HCl, the solution extracted with ethyl acetate and made basic with 10% NaOH. The oil which separated is extracted into ether and the extracts dried over $K_2CO_3$. Treatment with 2.5 g. of maleic acid in ether gives a solid, m.p. 149°–150°. Recrystallization from 125 ml. of ethyl acetate gives 5-methyl-2-phenyl-3,5-oxazatricyclo[5.2.2.0$^{2,6}$]undecane maleate, m.p. 149–151°.

Anal. Calcd. for $C_{20}H_{25}NO_5$: C, 66.83; H, 7.01; N, 3.90.

Found: C, 66.44; H, 7.15; N, 4.05.

EXAMPLE 20

2-(3-Trifluoromethylphenyl)-5-methyl-3,5-oxazatricyclo[5.2.2.0$^{2,6}$]undecane hydrochloride A mixture of 3.9 g. (0.0142 M) of 2-(3-trifluoromethylphenyl)-3-aminobicyclo[2.2.2]octan-2-ol, 20 ml. of 90 percent formic acid and 10 ml. of 37 percent formaldehyde is refluxed 24 hours. Excess aqueous KOH is added and the oil which separated extracted into ether. The ether solution is washed with water and dried over $K_2CO_3$. Treatment with ethereal HCl gives 2-(3-trifluoromethylphenyl)-5-methyl-3,5-oxazatricyclo [5.2.2.0$^{2,6}$]undecane hydrochloride as a solid, m.p. 222°–223°.

Anal. Calcd. for $C_{17}H_{21}ClF_3NO$: C, 58.70; H, 6.07; F, 16.39; N, 4.02.

Found: C, 58.50; H, 6.22; F, 16.90; N, 3.44.

EXAMPLE 21

5-Methyl-2-phenyl-3,5-oxazatricyclo[5.2.2.0$^{2,6}$]undecane methobromide

The base is liberated from 3.8 g. (0.0145 M) of maleate salt of Example 19, the oil which separates is extracted into ether and dried over $K_2CO_3$. The ether is removed, the residue dissolved in 40 ml. of 1:1 ethylacetate-isopropanol and the solution treated with 6.3 g. of methyl bromide. On refrigeration for several days, no precipitate is observed and the solution is heated on a steam bath for one-half hours. The solvents are removed and the residue triturated first with ether and then with ethyl acetate to give a solid, m.p. 238°–240°. Treatment of the ether soluble portion with additional methyl bromide as a slow stream gives additional material. Recrystallization from 50 ml. of acetonitrile gives, after washing the precipitate with acetone, 5-methyl-2-phenyl-3,5-oxazatricyclo [5.2.2.0$^{2,6}$]undecane methobromide as a solid, m.p. 230°–232°.

Anal. Calcd. for $C_{17}H_{24}BrNO$: C, 60.35; H, 7.15; Br, 23.62; N, 4.14.

Found: C, 59.86; H, 7.25; Br, 23.30; N, 3.97.

EXAMPLE 22

N-Benzyl-2-phenyl-3-aminobicyclo[2.2.2]octan-2-ol Maleate

A mixture of 4.34 g. (0.02 M) of 2-phenyl-3-aminobicyclo [2.2.2]octan-2-ol, 2.78 g. (0.022 M) benzyl chloride and 2.72 g. (0.02 M) of potassium carbonate in 100 ml. ethanol is refluxed for 20 hours, filtered, and the EtOH removed. The residual is taken up in ether, washed with water, dried and treated with ethereal maleic acid to give the crude salt, m.p. 146°–180°. Two recrystallizations from 2-butanone gives N-benzyl-2-phenyl-3-aminobicyclo[2.2.2]octan-2-ol maleate, m.p. 137.5°–140°.

Anal. Calcd. for $C_{15}H_{19}NO_5$: C, 70.90; H, 6.90; N, 3.31.

Found: C, 71.29; H, 7.00; N, 3.43.

EXAMPLE 23

3-Pyrrolidino-2-phenylbicyclo[2.2.2]octan-2-ol maleate

A mixture of 4.34 g. (0.02 M) of 2-phenyl-3-aminobicyclo [2.2.2]octan-2-ol, 4.74 g. (0.022 M) of 1,4-dibromobutane, 4.08 g. (0.03 M) of $K_2CO_3$, and 100 ml. of ethanol is refluxed for 96 hours while following the reaction with TLC (silicaethyl acetate). The solids are filtered and washed with ether. Removal of the solvents leaves an oil which is chromatographed on 100 g. of silica. Elution with $CHCl_3$ gives the crude pyrrolidino compound which is added to a solution of 2.2 g. of maleic acid in ether. The maleate which precipitates is quite soluble in methyl ethyl ketone and is purified by boiling with ethyl acetate containing a small amount of methyl ethyl ketone. In this manner 3-pyrrolidino-2-phenylbicyclo [2.2.2]octan-2-ol maleate as a solid, m.p. 154°–156°, is obtained.

Anal. Calcd. for $C_{22}H_{29}NO_5$: C, 68.19; H, 7.54; N, 3.62.

Found: C, 68.60; H, 7.73; N, 3.72.

EXAMPLE 24

2-Benzyl-3-aminobicyclo[2.2.2]octan-2-ol

3-Aminobicyclo[2.2.2]-octanone hydrochloride (5.3 g., 0.033 mole) is added in portions to the Grignard reagent prepared from 20.9 g. (0.165 mole) of benzyl chloride, 3.97 g. (0.165 mole) of magnesium and 165 ml. (from LAH) of dry ether. After stirring at room temperature for 22 hours, the cooled mixture is treated with a mixture of 16.5 ml. of concentrated $NH_4OH$ and 42 ml. of water. The ether layer is decanted and the residue stirred with 2 × 200 ml. portions of ether. The combined ether extracts are washed with water and extracted with 1:4 $HCl-H_2O$. The acid extracts are basified with $K_2CO_3$ and the oil which separates extracted into ether. After drying over $K_2CO_3$ the solvent is removed to give a solid. Recrystallization from petroleum ether gives a 2-benzyl-3-aminobicyclo[2.2.2]octan-2-ol which melts at 91°–92°.

Anal. Calcd. for $C_{15}H_{21}NO$: C, 77.88; H, 9.15; N, 6.06.

Found: C, 77.73; H, 8.94; N, 6.14.

EXAMPLE 25

2-(3,4-Dichlorobenzyl)-3-aminobicyclo[2.2.2]octan-2-ol

3-Aminobicyclo[2.2.2]octanone hydrochloride (17.5 g., 0.1 mole) is added in portions to the Grignard reagent prepared from 97.7 g. (0.5 mole) α,3,4-trichlorotoluene, 12.15 g. (0.5 mole) of magnesium and 500 ml. of dry ether. The mixture is refluxed for 26 hours, cooled in ice and decomposed with a mixture of 50 ml. of concentrated $NH_4OH$ and 450 ml. of water. The resultant emulsion is filtered to separate the layers. The ether layer separated, dried with $Na_2SO_4$ and the solvent concentrated. Dilution with petroleum ether gives 2-(3,4-dichlorobenzyl)-3-aminobicyclo[2.2.2]octan-2-ol as a solid, m.p. 113°–114°.

Anal. Calcd. for $C_{15}H_{19}Cl_2NO$: C, 60.00; H, 6.37; Cl, 23.62; N, 4.66.

Found: C, 60.22; H, 6.49; Cl, 23.10; N, 4.65.

EXAMPLE 26

2-(3-Chlorophenyl)-3-aminobicyclo[2.2.2]octan-2-ol hydrochloride

To the Grignard reagent prepared from 95.7 g. (0.5 mole) of 1-bromo-3-chlorobenzene, 12.15 g. (0.5 mole) magnesium, and 500 ml. dry ($CaH_2$) ether, is added, in portions, 17.5 g. (0.1 mole) of 3-aminobicyclo[2.2.2]octanone HCl. After stirring at room temperature for 18 hours, the mixture is cooled in ice and treated with 250 ml. of water dropwise. The ether layer is decanted and the residue stirred with 2 × 500 ml. portions of ether. Shaking the ether with 100 ml. of 9:1 $H_2O$-HCl gives the hydrochloride salt, m.p. 232°–240°, which is insoluble in both layers. A sample recrystallized from isopropanol-ethanol melts at 268°–269°.

Anal. Calcd. for $C_{14}H_{19}Cl_2NO$: C, 58.34; H, 6.64; Cl, 24.60; N, 4.86.

Found: C, 58.65; H, 6.67; Cl, 24.22; N, 4.58.

EXAMPLE 27

2-(3-Chlorophenyl)-3-aminobicyclo[2.2.2]octan-2-ol

The base is released by solution of the remainder of the salt in methanol and addition of 10% NaOH dropwise. This gives 2-(3-chlorophenyl)-3-aminobicyclo[2.2.2]octan-2-ol as a solid, m.p. 90°–92°. A sample recrystallized from petroleum ether melts at 99°–95.5°.

Anal. Calcd. for $C_{14}H_{18}ClNO$: C, 66.79; H, 7.21; Cl, 14.08; N, 5.57.

Found: C, 66.78; H, 7.29; Cl, 14.48; N, 5.44.

EXAMPLE 28

2-(4-Fluorophenyl)-3-aminobicyclo[2.2.2]octan-2-ol

To the Grignard reagent prepared from 70.2 g., (0.4 mole) of p-bromofluorobenzene, 400 ml. dry ($CaH_2$) ether and 9.7 g. (0.4 mole) of magnesium (activated with dibromoethane) is added 13.4 g. (0.0765 mole) of 3-aminobicyclo[2.2.2]octanone hydrochloride in portions. After stirring 18 hours at room temperature the mixture is cooled in ice and decomposed with 200 ml. of water. The ether layer is decanted and the residue stirred with several additional portions of ether. After drying over $Na_2SO_4$, the ether is removed and the residue triturated with petroleum ether to give 2-(4-fluorophenyl)-3-aminobicyclo [2.2.2]octan-2-ol which melts at 104°–108°. A sample recrystallized from petroleum ether melts at 107.5°–109.5°.

Anal. Calcd. for $C_{14}H_{18}FNO$: C, 71.44; H, 7.71; N, 5.95.

Found: C, 71.80; H, 8.05; N, 5.92.

EXAMPLE 29

2-(3,5-Dichlorophenyl)-3-aminobicyclo[2.2.2]octan-2-ol hydrochloride

To the Grignard reagent prepared from 112.5 g. (0.5 mole) of 3,5-dichlorobromobenzene, 12.15 g. (0.5 mole) of magnesium and 600 ml. of dry ($CaH_2$) ether is added 21.8 g. (0.125 mole) of 3-aminobicyclo[2.2.2]-octanone hydrochloride in portions. The mixture is stirred at room temperature for 18 hours, cooled in ice and treated slowly with 250 ml. of water. The ether is decanted and the residue stirred with 2 × 500 ml. portions of ether. Treatment of the combined ether layers with $Et_2O$-HCl gives 2-(3,5-dichlorophenyl)-3-aminobicyclo [2.2.2]octan-2-ol hydrochloride. Recrystallization from i-PrOH-$MeNO_2$ raises the melting point to 250°–254°. Further recrystallization from MeOH-$MeNO_2$ raises it to 256°–258°.

Anal. Calcd. for $C_{14}H_{18}Cl_3NO$: C, 52.12; H, 5.67; Cl, 32.96; N, 4.34.

Found: C, 52.38; H, 5.68; Cl, 32.80; N, 4.36.

EXAMPLE 30

2-(3,5-Dichlorophenyl)-3-aminobicyclo[2.2.2]octan-2-ol

The remaining salt of Example 29 is dissolved in MeOH and treated dropwise with 10% NaOH to give 2-(3,5-dichlorophenyl)-3-aminobicyclo[2.2.2]octan-2-ol, m.p. 120°–122°.

Anal. Calcd. for $C_{14}H_{17}Cl_2NO$: C, 58.75; H, 5.98; Cl, 24.78.

Found: C, 58.29; H, 6.17; Cl, 25.65.

EXAMPLE 31

N-2-Butyl-2-(3-trifluoromethylphenyl)-3-aminobicyclo[2.2.2]octan-2-ol Hydrochloride A mixture of 5.7 g. (0.02 mole) 2-(3-trifluoromethylphenyl)-3-aminobicyclo[2.2.2]octan-2-ol, 10 ml. of 2-butanone and 50 ml. of ethanol is refluxed for 5 hours, the solvent removed and the residual oil treated with petroleum ether. A small amount of insoluble solids are filtered and the filtrate refrigerated. The solvent is removed and the residual oil dissolved in 50 ml. of dry ether. This solution is added dropwise to 0.76 g. (0.02 mole) of LAH in 50 ml. of ether and the mixture refluxed for 4 hours. It is then cooled in ice and treated with 2.0 ml. of water. The solids are filtered and the filtrate treated with ethereal HCl to give N-2-butyl-2-(3-trifluoromethylphenyl)-3-aminobicyclo[2.2.2]octan-2-ol hydrochloride, m.p. 238°–240°. Recrystallization from nitromethane raises the melting point to 2-46°–248°.

Anal. Calcd. for $C_{19}H_{27}ClF_3NO$: C, 60.39; H, 7.20; Cl, 9.39; N, 3.71.

Found: C, 60.27; H, 7.02; Cl, 9.03; N, 4.26.

EXAMPLE 32

N-Cyclopentyl-2-(3,4-dichlorophenyl)-3-aminobicyclo[2.2.2]octan-2-ol hydrochloride A solution of 2-(3,4-dichlorophenyl)-4,4-tetramethylene-3,5-oxazatricyclo[5.2.2.0$^{2,6}$]undecane in 75 ml. of dry (CaH$_2$) ether is added to 0.5 g. of LAH in 50 ml. of dry ether and the mixture refluxed for 4 hours. The mixture is cooled in ice and decomposed with 1.5 ml. of water. Treatment of the filtrate with ethereal HCl gives N-cyclopentyl-2-(3,4-dichlorophenyl)-3-aminobicyclo[2.2.2]octan-2-ol hydrochloride, m.p. 272°–275°. Recrystallization from MeNO$_2$-MeOH raises the melting point to 292°–294°.

Anal. Calcd. for $C_{19}H_{26}Cl_3NO$: C, 58.40; H, 6.71; Cl, 27.22; N, 3.58.

Found: C, 58.31; H, 6.81; Cl, 27.08; N, 3.63.

EXAMPLE 33

N-Isopropyl-2-(3-chlorophenyl)-3-aminobicyclo[2.2.2]octan-2-ol hydrochloride

A mixture of 6.45 g. (0.025 mole) of 2-(3-chlorophenyl)-3-aminobicyclo[2.2.2octan-2-ol, 12.5 ml. of acetone and 37.5 ml. of ethanol is refluxed for 5 hours and the solvents removed with a stream of nitrogen. The residue is dissolved in 25 ml. of petroleum ether to give a solid, 4.3 g., m.p. 85°–89°. This material is added in portions to 0.74 g. of LAH in 150 ml. of dry ether and the mixture refluxed for 4 hours. After addition of 2.0 ml. of water, the solids are filtered and the filtrate treated with ethereal hydrogen chloride to give N-isopropyl-2-(3-chlorophenyl)-3-aminobicyclo[2.2.2]octan-2-ol hydrochloride, m.p. 254°–255°. Several recrystallizations from methanol-nitromethane raise the melting point to 273°–274°.

Anal. Calcd. for $C_{17}H_{25}Cl_2NO$: C, 61.81; H, 7.63; N, 4.23.

Found: C, 61.88; H, 7.46; N, 4.30.

EXAMPLE 34

2-(4-Fluorophenyl)-4,4-dimethyl-3,5-oxazatricyclo[5.2.2.0$^{2,6}$]undecane

A mixture of 3.52 g. (0.015 mole) of 2-(4-fluorophenyl)-3-aminobicyclo[2.2.2]octan-2-ol, 7.5 ml. of acetone and 37.5 ml. of ethanol is refluxed for 19 hours, the solvents removed and the residue dissolved in petroleum ether to give 2-(4-fluorophenyl)-4,4-dimethyl-3,5-oxazatricyclo[5.2.2.0$^{2,6}$]undecane, m.p. 116°–121°. A sample recrystallized from petroleum ether melts at 120°–122°.

Anal. Calcd. for $C_{17}H_{22}FNO$: C, 74.14; H, 8.05; N, 5.09.

Found: C, 74.51; H, 7.92; N, 4.96.

EXAMPLE 35

N-Isopropyl-2-(4-fluorophenyl)-3-aminobicyclo[2.2.2]octan-2-ol hydrochloride

A solution of 3.07 g. (0.011 mole) of 2-(4-fluorophenyl)-4,4-dimethyl-3,5-oxazatricyclo[5.2.2.0$^{2,6}$]undecane in 25 ml. of dry (CaH$_2$) ether is added dropwise to 0.42 g. (0.011 mole) of LaH in 50 ml. of dry ether. The mixture is refluxed 4 hours, cooled in ice and decomposed with 1.5 ml. of water. The solids are filtered, washed well with ether and the combined filtrates treated with ethereal HCl to give N-isopropyl-2-(4-fluorophenyl)-3-aminobicyclo[2.2.2]octan-2-ol hydrochloride, m.p. 241°–245°. Recrystallization from MeNO$_2$-MeOH raises the melting point to 265°–267°.

Anal. Calcd. for $C_{17}H_{25}ClFNO$: C, 65.05; H, 8.06; N, 4.46.

Found: C, 65.22; H, 7.95; N, 4.45.

EXAMPLE 36

2-(3,4-Dichlorobenzyl)-4,4-dimethyl-3,5-oxazatricyclo[5.2.2.0$^{2,6}$]undecane

A mixture of 6.0 g. (0.02 mole) of 2-(3,4-dichlorobenzyl)-3-aminobicyclo[2.2.2]octan-2-ol, 10 ml. of acetone and 50 ml. of ethanol is refluxed for 5 hours. Precipitation begins after 2 hours. Cooling and filtering gives 2-(3,4-dichlorobenzyl)-4,4-dimethyl-3,5-oxazatricyclo[5.2.2.0$^{2,6}$]undecane, m.p. 157°–158°. A sample recrystallized from acetonitrile melts at 156°–159°.

Anal. Calcd. for $C_{18}H_{23}Cl_2NO$: C, 63.53; H, 6.80; Cl, 20.84; N, 4.12.

Found: C, 62.92; H, 6.77; Cl, 20.85; N, 4.48.

EXAMPLE 37

N-Isopropyl-2-(3,4-dichlorobenzyl)-3-aminobicyclo[2.2.2]octan-2-ol hydrochloride A solution of 3.4 g. (0.01 mole) of 2-(3,4-dichlorobenzyl)-4,4-dimethyl-3,5-oxazatricyclo[5.2.2.0$^{2,6}$]undecane in 50 ml. dry (CaH$_2$) ether is added to 0.5 g. LAH in 100 ml. of dry ether. After refluxing 4 hours, the mixture is cooled in ice and decomposed with 1.5 ml. of water. Filtration and treatment of the filtrate with Et$_2$O-HCl gives N-isopropyl-2-(3,4-dichlorobenzyl)-3-aminobicyclo[2.2.2]octan-2-ol hydrochloride. Recrystallization from MeOH-i-PrOH gives a sample which melts at 227°–229°.

Anal. Calcd. for $C_{18}H_{26}Cl_3NO$: C, 57.08; H, 6.92; Cl, 28.09; N, 3.70.

Found: C, 57.44; H, 6.73; Cl, 27.65; N, 3.58.

EXAMPLE 38

N-2-Phenethyl-2-(3,4-dichlorophenyl)-3-aminobicyclo[2.2.2]octan-2-ol hydrochloride A mixture of 4.29 g. (0.015 mole) of 3-amino-2-(3,4-dichlorophenyl)-bicyclo[2.2.2]octanol, 2.0 g. (0.0167 mole) of freshly distilled phenylacetaldehyde and 50 ml. of ethanol is refluxed for 5 hours and the mixture diluted with 250 ml. of water. The oil is extracted into ether, the ether extracts dried over $CaCl_2$, the solvent removed and the residue dissolved in 50 ml. of 1:1 $CCl_4$-methylcyclonexane giving a sample, m.p. 119°–122°, of the oxazolidine. This oxazolidine, 2.7 g. (0.007 mole), is added to 0.5 g. of LAH in 100 ml. of dry ($CaH_2$) ether in portions, and the mixture refluxed for 4 hours. After cooling in ice, it is decomposed with 1.5 ml. of water and the solids filtered and washed well with ether. Treatment with ether-HCl gives N-2-phenethyl-2-(3,4-dichlorophenyl)-3-aminobicyclo[2.2.2]octan-2-ol hydrochloride, m.p. 253°–256°. Recrystallization from $CH_3OH$—$CH_3CN$ raises the melting point to 260°–262°.

Anal. Calcd. for $C_{22}H_{26}Cl_3NO$: C, 61.90; H, 6.14; N, 3.28.

Found: C, 62.33; H, 6.03; N, 3.37.

EXAMPLE 40

N,N-Dimethyl-2-phenyl-cis-3-aminobicyclo[2.2.2]octan-2-ol Hydrochloride

A mixture of 3.4 g. (0.0156 M) of 2-phenyl-cis-3-amino-bicyclo[2.2.2]octan-2-ol, 10 ml. of 37 percent formaldehyde, and 20 ml. of 97–100 percent formic acid is refluxed for 24 hours, the solution cooled and made basic with excess 10% NaOH. The oil which separates is extracted into ether, the extract dried over calcium chloride and the solvent removed. The residue, in 50 ml. of tetrahydrofuran, is refluxed for 15 hours, cooled and the mixture decomposed with 3.0 ml. of water. The solids are filtered and the solvents removed from the filtrate. The amine is isolated by chromatography on silica gel and elution with chloroform. The material is dissolved in ether and treated with ethereal hydrogen chloride to give the amine salt. A sample recrystallized from nitromethane melts at 259°–260°.

Anal. Calcd. for $C_{16}H_{24}ClNO$: C, 68.18; N, 8.59; N, 4.97.

Found: C, 67.68; N, 8.47; N, 5.09.

EXAMPLE 41

3-Amino-2-(3,4-dichlorophenyl)bicyclo[2.2.2]octan-2-ol Hydrochloride

3-Aminobicyclo[2.2.2]octanone hydrochloride (14.0 g., 0.08M) is added, in portions, to the Grignard reagent prepared from 90.4 g. (0.4M) of 3,4-dichlorobromobenzene, 9.7 g. (0.4M) of magnesium, and 400 ml. of ether. After stirring 21 hours at room temperature, the mixture is cooled in ice and treated with dilute aqueous ammonia. The ether is decanted and the residual emulsion extracted with several portions of ether. Shaking the organic phase with aqueous HCl gives 3-amino-2-(3,4-dichlorophenyl)bicyclo[2.2.2]octan-2-ol hydrochloride as a solid, m.p. 242°–244°. Recrystallization from methanol-acetonitrile gives a sample that melts at 243.5°–244.5°.

Anal. Calcd. for $C_{14}H_{18}Cl_3NO$: C, 52.12; H, 5.67; Cl, 32.96; N, 4.34.

Found: C, 52.25; H, 5.81; Cl, 32.92; N, 4.55.

EXAMPLE 42

3-Amino-2-(3,4-dichlorophenyl)bicyclo[2.2.2]octan-2-ol

The base is liberated from the hydrochloride of Example 11 with 10% NaOH and recrystallized from ethanol to yield 3-amino-2-(3,4-dichlorophenyl)bicyclo[2.2.2]octan-2-ol, m.p. 114°–116°.

Anal. Calcd. for $C_{14}H_{17}Cl_2NO$: C, 58.75; H, 5.98; Cl, 24.78; N, 4.89.

Found: C, 59.00; H, 6.00; Cl, 24.60; N, 4.76.

EXAMPLE 43

N-Carbomethoxy-2-(3,4-dichlorophenyl)-3-aminobicyclo[2.2.2]octan-2-ol (A) and 2-(3,4-dichlorophenyl)3,5-oxazatricyclo[5.2.2.0$^{2,6}$]-undecan-4-one (B)

A solution of 5.7 g. (0.02M) of 2-(3,4-dichlorophenyl)-3-aminobicyclo[2.2.2]octan-2-ol in 50 ml. of dry benzene containing 3.0 ml. of triethylamine is treated dropwise with 2.08 g. (0.022M) of freshly distilled (b.p. 70°) methyl chloroformate in 25 ml. of dry benzene. The addition is mildly exothermic. After 6 hours at room temperature, the mixture is extracted with 50 ml. of water, 50 ml. of 3N HCl and 50 ml. of water. The aqueous extracts are washed with ether and these combined with the benzene. After drying with $CaCl_2$ the solvents are removed to give a solid, m.p. 141°–143°. TLC (silica-ether) shows it to be a mixture of two substances. Chromatography on 200 g. of silica and elution with chloroform gives the urethane, m.p. 154°–155°. Recrystallization from ethanol raised the m.p. to 154°–156°.

A. Anal. Calcd. for $C_{16}H_{19}Cl_2NO_3$: C, 55.82; H, 5.56; Cl, 20.59; N, 4.07.

Found: C, 55.58; H, 5.14; Cl, 21.00; N, 4.31.

Further elution gives a mixture and then the oxazolidinone, m.p. 174°–185°. Recrystallization from a small amount of ethanol gives a m.p. of 196°–198°.

B. Anal. Calcd. for $C_{15}H_{15}Cl_2NO_2$: C, 57.73; H, 4.85; Cl, 22.72; N, 4.49.

Found: C, 57.74; H, 4.65; Cl, 22.70; N, 4.40.

EXAMPLE 44

N-Methyl-2-(3,4-dichlorophenyl)-3-aminobicyclo[2.2.2]octan-2-ol Hydrochloride

The urethane, N-carbomethoxy-2-(3,4-dichlorophenyl)-3-aminobicyclo[2.2.2]octan-2-ol, (2.06 g., 0.006M) is added all at once to a mixture of 0.76 g. (0.02M) of $LiAlH_4$ and 100 ml. of ether. After refluxing 24 hours, the mixture is cooled and treated with 2.0 ml. of water. After stirring for 0.5 hours, the solids are filtered and the filtrate treated with ethereal HCl to give a solid, m.p. 276°–279°.

From 2.0 g. of a mixture of oxazolidinone and urethane a hydrochloride of m.p. 276°–280° is obtained.

The combined hydrochlorides are recrystallized from 185 ml. of boiling water to give N-methyl-2-(3,4-dichlorophenyl)- and 3-aminobicyclo[2.2.2]octan-2-ol hydrochloride as a solid, m.p. 291°–292°.

Anal. Calcd. for $C_{16}H_{21}ClF_3NO$: C, 57.23; H, 6.30; Cl, 10.56; N, 4.17.

Found: C, 57.32; H, 6.41; Cl, 11.10; N, 4.23.

EXAMPLE 45

2-(3,4-Dichlorophenyl)-4,4-dimethyl-3,5-oxazatricyclo[5.2.2.0$^{2,6}$]undecane

A mixture of 5.7 g. (0.02M) of 2-(3,4-dichlorophenyl)-3-aminobicyclo[2.2.2]octan-2-ol, 10 ml. of acetone and 50 ml. of ethanol is refluxed for 5 hours and the solvents removed. Recrystallization of the residue from 50 ml. of petroleum ether gives 2-(3,4-dichlorophenyl)-4,4-dimethyl-3,5-oxazatricyclo[5.2.2.0$^{2,6}$]undecane as a solid, m.p. 120°–122°.

Anal. Calcd. for $C_{17}H_{21}Cl_2NO$: C, 62.58; H, 6.49; Cl, 21.73; N, 4.30.

Found: C, 63.06; H, 6.30; Cl, 22.08; N, 4.24.

EXAMPLE 46

N-Isopropyl-2-(3,4-dichlorophenyl)-3-aminobicyclo[2.2.2]octan-2-ol

A solution of 1.7 g. (0.0052M) of 2-(3,4-dichlorophenyl)-4,4-dimethyl-3,5-oxazatricyclo[5.2.2.0$^{2,6}$]undecane in 25 ml. of dry THF is added dropwise to a stirred mixture of 0.5 g. of LiAlH$_4$ in 25 ml. of dry THF. After refluxing 4 hours, the mixture is cooled, treated with 1.0 ml. of water and stirring continued for 2 hours. The solids are filtered, the solvent removed and the solid residue dissolved in 25 ml. of hot petroleum ether to give N-isopropyl-2-(3,4-dichlorophenyl)-3-aminobicyclo[2.2.2]octan-2-ol as a solid, m.p. 133°–136°.

Anal. Calcd. for $C_{17}H_{23}Cl_2NO$: C, 62.20; H, 7.06; Cl, 21.60; N, 4.27.

Found: C, 62.16; H, 7.12; Cl, 21.60; N, 4.10.

The maleate, prepared in ether, melts at 197°–199° after recrystallization from isopropanol.

Anal. Calcd. for $C_{21}H_{27}Cl_2NO_5$: C, 56.76; H, 6.13; N, 3.15.

Found: C, 56.94; H, 5.85; N, 3.13.

EXAMPLE 47

2-(3,4-Dichlorophenyl)-5-methyl-3,5-oxazatricyclo[5.2.2.0$^{2,6}$]-undecane Hydrochloride A mixture of 4.0 g. (0.014M) of 2-(3,4-dichlorophenyl)-3-aminobicyclo[2.2.2]octan-2-ol, 20 ml. of 90 percent formic acid and 10 ml. of 37 percent formaldehyde is refluxed for 24 hours. Addition of 30 ml. of 6N HCl to the cooled solution gives a solid, m.p. 263°–264°. Recrystallization from 50 ml. of 1:1 ethanol-water gives 2-(3,4-dichlorophenyl)-5-methyl-3,5-oxazatricyclo[5.2.2.0$^{2,6}$]undecane hydrochloride.

Anal. Calcd. for $C_{16}H_{20}Cl_3NO$: C, 55.11; H, 5.78; Cl, 30.42; N, 4.02.

Found: C, 55.23; H, 5.87; Cl, 30.30; N, 3.77.

EXAMPLE 48

N,N-Dimethyl-2-(3,4-dichlorophenyl)-3-aminobicyclo[2.2.2]-octan-2-ol Hydrochloride 2-(3,4-Dichlorophenyl)-5-methyl-3,5-oxazatricyclo[5.2.2.0$^{2,6}$]undecane hydrochloride, 2.2 g., is treated with 10% NaOH and the base extracted into CHCl$_3$. After drying over CaCl$_2$ the solvent is removed and the residue, in 50 ml. of dry (CaH$_2$) ether, added to 0.5 g. LAH in 50 ml. of ether. After refluxing 5.5 hours, and stirring overnight, the mixture is cooled and treated with 1.5 ml. of H$_2$O. After 1 hour, the solids are filtered, rinsed well with ether and the filtrates treated with ether-HCl to give an oil which solidified on trituration with CH$_3$CN. The solid, N,N-dimethyl-2-(3,4-dichlorophenyl)-3-aminobicyclo[2.2.2]octan-2-ol hydrochloride, m.p. 295°–296°, recrystallized from MeOH-CH$_3$CN to a purified sample which melts at 300°–301°.

Anal. Calcd. for $C_{16}H_{22}Cl_3NO$: C, 54.78; H, 6.32; N, 3.99.

Found: C, 55.29; H, 6.20; N, 4.51.

EXAMPLE 49

3-(3,4-Dichlorophenyl)-3-hydroxybicyclo[2.2.2]octanone Oxime

To the Grignard reagent prepared from 100 g. (0.44 mole) of 3,4-dichlorobromobenzene, 10.8 g. (0.44 mole) of magnesium and 400 ml. of dry ether (initiated with 0.5 ml. of dibromoethane) is added 30.6 g. (0.2 mole) of bicyclo[2.2.2]octan-2,3-dione monoxime in 100 ml. of dry benzene and the mixture refluxed for 6 hours. The reaction mixture is decomposed with dilute HCl, the organic layer separated and the aqueous phase extracted with ether. The combined organic layers are dried over CaCl$_2$, the solvents removed and the residue boiled with cyclohexane. The solids are filtered to yield 3-(3,4-dichlorophenyl)-3-hydroxybicyclo[2.2.2]octanone oxime, m.p. 180°–182.5°. Recrystallization from ethanol raises a m.p. of 180.5°–182.5°.

Anal. Calcd. for $C_{14}H_{13}ClNO_2$: C, 56.01; H, 5.04; Cl, 23.63; N, 4.67.

Found: C, 55.96; H, 5.24; Cl, 23.61; N, 4.65.

EXAMPLE 50

2-(3,4-Dichlorophenyl)-3-aminobicyclo[2.2.2]octan-2-ol 3-(3,4-Dichlorophenyl)-3-hydroxybicyclo[2.2.2]octanone oxime (18.0 g., 0.06 mole) is added in portions to 6.85 g. (0.18 mole) of LAH in 400 ml. of dry (CaH$_2$) ether. The mixture is refluxed for 5 hours, stirred at room temperature overnight, cooled in ice and decomposed with 25 ml. of ethyl acetate followed by 15 ml. of water. After stirring 1 hour, the solids are filtered and washed well with ether. Shaking the ether solution with 1:9 HCl-H$_2$O gives 2-(3,4-dichlorophenyl)-3-aminobicyclo[2.2.2]octan-2-ol as the hydrochloride, m.p. 242°–243°.

EXAMPLE 51

2-(3,4-Dimethylphenyl)-3-aminobicyclo[2.2.2]octan-2-ol

The amino ketone hydrochloride of Example 4 (17.5 g., 0.1 mole) is added in portions to the Grignard reagent prepared from 92.5 g. (0.5 mole) of 4-bromo-o-xylene, 12.2 g. (0.5 mole) of magnesium and 500 ml. of dry ether with cooling. The mixture is allowed to stand at room temperature for 18 hours, cooled in ice, and decomposed with ammonium chloride solution. The ether layer is decanted and extracted with dilute HCl. Treatment of the extracts with dilute KOH gives 2-(3,4-dimethylphenyl)-3-aminobicyclo[2.2.2]octan-2-ol, m.p. 90°–96°. A sample recrystallized from petroleum ether has a melting point of 100°–102°.

Anal. Calcd. for $C_{16}H_{23}NO$: C, 78.33; H, 9.45; N, 5.71.

Found: C, 77.86; H, 9.30; N, 5.93.

EXAMPLE 52

N-iso-Propyl-2-(3,4-dimethylphenyl)-3-aminobicyclo[2.2.2]octan-2-ol

A mixture of 2-(3,4-dimethylphenyl)-3-aminobicyclo[2.2.2]octan-2-ol, 10 ml. of acetone and 50 ml. of ethanol is refluxed for 5.5 hours, the solvent removed and the residual oil, in 50 ml. of dry ether, added dropwise to 1.0 g. of LAH in 50 ml. of dry ether. After 4 hours at reflux, the reaction mixture is cooled in ice, decomposed with 3.0 ml. of water, the solids filtered, and the filtrate treated with ethereal HCl to give N-iso-propyl-2-(3,4-dimethylphenyl)-3-aminobicyclo[2.2.2]octan-2-ol as a solid, m.p. 251°–252°. A sample recrystallized from iso-propanol has a melting point of 255°–257°.

Anal. Calcd. for $C_{19}H_{30}ClNO$: C, 70.45; H, 9.33; N, 4.32.

Found: C, 69.90; H, 9.18; N. 3.97.

EXAMPLE 53

2-(2-Naphthyl)-3-aminobicyclo[2.2.2]octan-2-ol

The amino ketone hydrochloride of Example 4 (10.5 g., 0.06 mole) is added in portions to the Grignard reagent from 60 g. (0.29 mole) of 2-bromonaphthalene, 7.1 g. (0.29 mole) of magnesium and 400 ml. of dry ether. The mixture is refluxed for 16 hours, cooled in ice and decomposed with ammonium chloride solution. The ether layer is decanted and extracted with dilute HCl. Addition of dilute KOH solution to the acid extracts gives 2-(2-naphthyl)-3-aminobicyclo[2.2.2]octan-2-ol as a solid which when recrystallized from cyclohexane has a melting point of 138°–139°.

Anal. Calcd. for $C_{18}H_{21}NO$: C, 80.86; H, 7.92; N, 5.24.

Found: C, 80.97; H, 7.98; N, 5.25.

EXAMPLE 54

2-(2-Naphthyl)-4,4-dimethyl-3,5-oxazatricyclo[5.2.2.0$^{2,6}$]undecane

A mixture of 2.94 g. (0.011 mole) of 2-(2-naphthyl)-3-aminobicyclo[2.2.2]octan-2-ol, 5 ml. of acetone, and 25 ml. of ethanol is refluxed for 5 hours and the solvents removed to leave an oil which solidifies on standing. A small portion is recrystallized from petroleum ether in a Dry Ice bath to give 2-(2-naphthyl)-4,4-dimethyl-3,5-oxazatricyclo[5.2.2.0$^{2,6}$]undecane, m.p. 113°–115°.

Anal. Calcd. for $C_{21}H_{25}NO$: C, 82.04; H, 8.20; N, 4.56.

Found: C, 81.92; H, 8.07; N, 4.58.

EXAMPLE 55

N-iso-Propyl-2-(2-naphthyl)-3-aminobicyclo[2.2.2]octan-2-ol hydrochloride 2-(2-Naphthyl)-4,4-dimethyl-3,5-oxazatricyclo[5.2.2.0$^{2,6}$]undecane (3.2 g., 0.0104 mole) is added in portions to a suspension of 1.0 g. of LAH in 100 ml. of dry ether and the mixture is refluxed for 4 hours, cooled in ice, and decomposed with 3.0 ml. of water. The solids are filtered and rinsed well with ether. Treatment with ethereal HCl gives a solid which melts with foaming at 110°. Recrystallization from 200 ml. of nitromethane gives N-iso-propyl-2-(2-naphthyl)-3-aminobicyclo[2.2.2]octan-2-ol hydrochloride, m.p. 251°–252°.

Anal. Calcd. for $C_{21}H_{28}ClNO$: C, 72.92; H, 8.16; N, 4.05.

Found: C, 72.63; H, 8.36; N, 4.25.

EXAMPLE 56

2-(3,4-Dichlorophenyl)-trans-3-aminobicyclo[2.2.2]octan-2-ol

A solution of 30.0 g. (0.1 mole) of the oxime of Example 50 in 175 ml. of ethanol is reduced at an initial 1,000 lbs. at 75° with the aid of 5.0 g. of 5% Rh/Al$_2$O$_3$. Uptake is quite rapid and is stopped after 2 equivalents of H$_2$ are absorbed. The catalyst is filtered and the solvent removed. The residue is treated with 250 ml. of ether, filtered and 0.65 g. of solid, m.p. 330°–340° collected. The ether is extracted with dilute HCl and the extracts made basic to give an oil. The oil is warmed with 50 ml. of methylcyclohexane to give 2-(3,4-dichlorophenyl)-trans-3-aminobicyclo[2.2.2]octan-2-ol as a solid, m.p. 126°–133°. A sample obtained from two recrystallizations from chloroform has a melting point of 138°–141°.

Anal. Calcd. for $C_{14}H_{17}Cl_2NO$: C, 59.00; H, 6.00; N, 4.76.

Found: C, 59.45; H, 6.22; N, 4.93.

EXAMPLE 57

N-iso-Propyl-2-(3,4-dichlorophenyl)-trans-3-aminobicyclo[2.2.2]octan-2-ol Maleate A mixture of 2.86 g. (0.01 mole) of 2-(3,4-dichlorophenyl)-trans-3-aminobicyclo[2.2.2]octan-2-ol, 24.6 g. (0.1 mole) of iso-propyl bromide, 2.0 g. of K$_2$CO$_3$, and 25 ml. of ethanol is refluxed for 5 days, the solids filtered, and rinsed well with ethanol. The solvent is removed and the residue chromatographed on 100 g. of silica. Elution with chloroform gives an oil which is treated with petroleum ether to give an insoluble solid, m.p. 190°–192°. The filtrate is concentrated and the residue, in ether, treated with maleic acid in ether to give N-iso-propyl-2-(3,4-dichlorophenyl)-trans-3-aminobicyclo[2.2.2]octan-2-ol maleate as a solid, m.p. 204°–206°. A sample recrystallized from isopropanol and then ethanol has a melting point of 205°–206°.

Anal. Calcd. for $C_{21}H_{27}Cl_2NO_5$: C, 56.76; H, 6.13; N, 3.15.

Found: C, 56.98; H, 6.04; N, 3.14.

I claim:

1. A compound selected from compounds of the formula

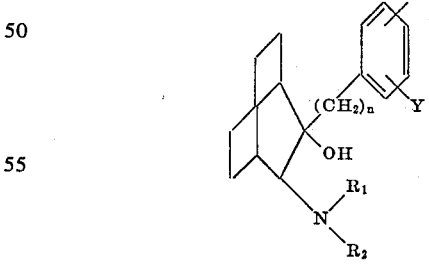

and nontoxic acid addition salts thereof wherein X and Y are selected from halogen, lower alkoxy of one to four carbon atoms, aralkoxy of seven to 13 carbon atoms and trifluoromethyl, $n$ is 0 or 1, and R$_1$ and R$_2$ are selected from hydrogen, lower alkyl, phenyl-lower alkyl of seven to 13 carbon atoms, and a cycloalkyl of three to seven carbon atoms.

2. A compound of claim 1 in which X is hydrogen and Y is fluoro, chloro or trifluoromethyl.

3. A compound of claim 1 in which X and Y are hydrogen and $R_1$ and $R_2$ are selected from hydrogen and lower alkyl.

4. A compound of claim 1 in which X and Y are hydrogen, chloro, fluoro, trifluoromethyl, methoxy or benzyloxy, $n$ is 0, $R_1$ is hydrogen and $R_2$ is lower alkyl.

5. A compound of claim 1 in which $n$ is 0.

6. A compound of claim 1 in which $R_1$ is hydrogen and $R_2$ is cyclopentyl.

7. A compound of claim 1 in which X is chloro, Y is hydrogen, $n$ is 1 and $R_1$ and $R_2$ are selected from lower alkyl, benzyl and cyclopentyl.

8. The compound of claim 1 which is N-2-butyl-2-(3-trifluoromethylphenyl)-3-aminobicyclo[2.2.2]octan-2-ol.

* * * * *